US012767531B2

(12) United States Patent
Zhou et al.

(10) Patent No.: US 12,767,531 B2
(45) Date of Patent: Oct. 20, 2026

(54) STEEL SMELTING METHOD

(71) Applicants: China University of Petroleum-Beijing, Beijing (CN); Beijing Carbon Zero Hydrogen Electric Technology Co., Ltd., Beijing (CN)

(72) Inventors: Hongjun Zhou, Beijing (CN); Guanglin Zhou, Beijing (CN); Weili Jiang, Beijing (CN); Enze Zhou, Beijing (CN); Quangui Wu, Beijing (CN)

(73) Assignee: CHINA UNIVERSITY OF PETROLEUM-BEIJING, Beijing (CN)

( * ) Notice: Subject to any disclaimer, the term of this patent is extended or adjusted under 35 U.S.C. 154(b) by 469 days.

(21) Appl. No.: 18/383,787

(22) Filed: Oct. 25, 2023

(65) Prior Publication Data

US 2024/0051821 A1 Feb. 15, 2024

Related U.S. Application Data

(63) Continuation of application No. PCT/CN2022/083730, filed on Mar. 29, 2022.

(30) Foreign Application Priority Data

Apr. 25, 2021 (CN) ........................ 202110448409.X

(51) Int. Cl.
*C01B 3/26* (2006.01)
*B01J 23/26* (2006.01)
*B01J 23/62* (2006.01)

(52) U.S. Cl.
CPC ................. *C01B 3/26* (2013.01); *B01J 23/26* (2013.01); *B01J 23/626* (2013.01);
(Continued)

(58) Field of Classification Search
None
See application file for complete search history.

(56) References Cited

U.S. PATENT DOCUMENTS 4,756,750 A * 7/1988 Bixler ................. C21B 13/0073 75/497
5,741,440 A 4/1998 Cooper et al.
(Continued)

FOREIGN PATENT DOCUMENTS

CN 1355836 A 6/2002
CN 101072740 A 11/2007
(Continued)

OTHER PUBLICATIONS

English translation of WO-2020004779-A1 Description. (Year: 2020).*
(Continued)

*Primary Examiner* — Anthony J Zimmer
*Assistant Examiner* — Zachary John Baum
(74) *Attorney, Agent, or Firm* — LOZA & LOZA, LLP; Michael F. Fedrick

(57) ABSTRACT

The present invention provides an iron and steel smelting method, wherein separating the product of the catalytic dehydrogenation reaction on propane to obtain a mixed gas containing hydrogen, methane, and ethane; and mixing the mixed gas with water and/or $CO_2$ as a catalytic conversion raw material, and producing synthesis gas by means of a catalytic conversion reaction, the synthesis gas being used for iron smelting, and electricity being used to provide energy for the catalytic conversion reaction. The method catalytic dehydrogenation of propane is combined with steam cracking, and unconverted propane is prepared into methane, ethane, etc. by means of steam cracking; synthesis gas is further obtained by means of reforming and compo-
(Continued)

nent adjustment, and the synthesis gas is a good raw material for direct reduction of iron.

20 Claims, 1 Drawing Sheet

(52) U.S. Cl.
CPC ................. *C01B 2203/0277* (2013.01); *C01B 2203/1058* (2013.01); *C01B 2203/1241* (2013.01); *C01B 2203/1264* (2013.01)

(56) References Cited

U.S. PATENT DOCUMENTS

| | | | |
|---|---|---|---|
| 2007/0099299 A1* | 5/2007 | Simon ................ | G01R 33/4641 436/37 |
| 2007/0299278 A1 | 12/2007 | Hechler et al. | |
| 2008/0269536 A1* | 10/2008 | Crone ..................... | C07C 5/327 585/655 |
| 2009/0211401 A1 | 8/2009 | Zendejas-Martinez et al. | |

FOREIGN PATENT DOCUMENTS

| | | | | |
|---|---|---|---|---|
| CN | 101130472 A | 2/2008 | | |
| CN | 101249949 A | 8/2008 | | |
| CN | 101321688 A | 12/2008 | | |
| CN | 101687633 A | 3/2010 | | |
| CN | 103525964 A | 1/2014 | | |
| CN | 103664455 A | 3/2014 | | |
| CN | 103666518 A | 3/2014 | | |
| CN | 103898265 A | 7/2014 | | |
| CN | 104072325 A | 10/2014 | | |
| CN | 106187662 A | 12/2016 | | |
| CN | 107253895 A | 10/2017 | | |
| CN | 108456128 A | 8/2018 | | |
| CN | 109775662 A | 5/2019 | | |
| CN | 109790018 A | 5/2019 | | |
| CN | 110422823 A | 11/2019 | | |
| CN | 215517509 U | 1/2022 | | |
| CN | 115724398 A | 3/2023 | | |
| DE | 102013104002 A1 | 10/2014 | | |
| DE | 102015110120 A1 | 12/2016 | | |
| WO | WO-0015587 A1 * | 3/2000 | .............. | C10G 2/30 |
| WO | 2005/049486 A1 | 6/2005 | | |
| WO | 2008/000740 A1 | 1/2008 | | |
| WO | 2016/059566 A1 | 4/2016 | | |
| WO | 2008/013349 A1 | 1/2018 | | |
| WO | 2018/136767 A1 | 7/2018 | | |
| WO | WO-2020004779 A1 * | 1/2020 | .............. | B01J 19/12 |
| WO | 2020/176647 A1 | 9/2020 | | |

OTHER PUBLICATIONS

Qian et al., Technological development hotspots in the future petrochemical industry: I. Refining chemical integration and olefin production technology, Petrochemical Technology & Application, vol. 21, No. 4, pp. 239-245 (2003).
Wang et al., Kinetic Analysis for CO2 Reforming with CH4 to Synthesis Gas by Plasma, gas chemical industry, vol. 32, pp. 26-31 (2007).
Bawah et al., Oxidative dehydrogenation of propane with CO2—A green process for propylene and hydrogen (syngas), International Journal of Hydrogen Energy, vol. 46, No. 5, pp. 3401-3413 (2020).
Office Action in corresponding Chinese Patent Application No. 202110448409.X, dated May 25, 2023, 6 pages.
Search Report in corresponding Chinese Patent Application No. 202110448409.X, dated May 23, 2023, 8 pages.
Search Report in corresponding Chinese Patent Application No. 202110448409.X, dated May 6, 2021, 10 pages.
Search Report in corresponding Chinese Patent Application No. 202110448409.X, dated Jun. 13, 2023, 4 pages.
International Search Report in corresponding International Patent Application No. PCT/CN2022/083730, dated Jul. 5, 2022, 3 pages.
Extended European Search Report issued on Mar. 24, 2025 for counterpart European Patent Application No. 1 22794467.5.

* cited by examiner

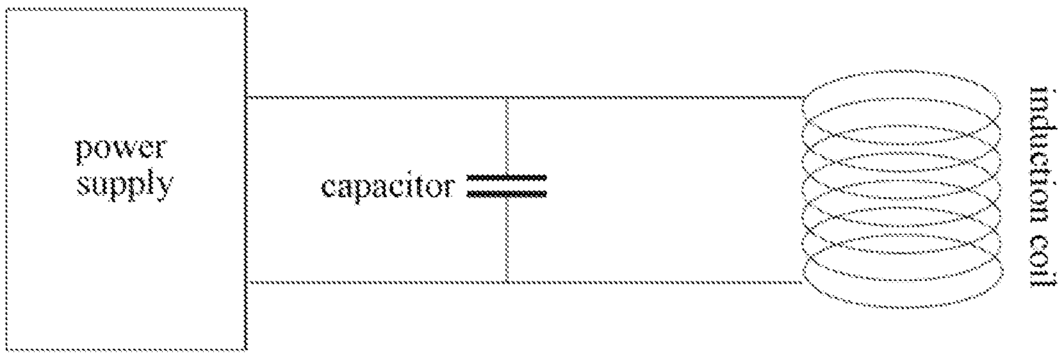
power supply
capacitor
induction coil

STEEL SMELTING METHOD

CROSS-REFERENCE TO RELATED APPLICATIONS

This application is a continuation of International Patent Application No. PCT/CN2022/083730, filed on Mar. 2, 2022, which claims priority to Chinese Patent Application No. 202110448409.X, filed on Apr. 25, 2021, both of which are hereby incorporated by reference in their entireties.

FIELD OF TECHNOLOGY

The present invention relates to a steel smelting method and belongs to the technical field of steel smelting.

BACKGROUND ART

Direct Reduced Iron (DRI), also known as sponge iron, is a kind of metallic iron obtained without blast furnace smelting, and the process of producing DRI is called non-blast furnace iron smelting process. The production process of DRI is divided into two categories: coal-based process and gas-based process. Among them, the gas-based method currently accounts for 90% of DRI production, and the typical processes are the tank method (HyL method) and the shaft furnace method (Midrex method). The shaft furnace method adopts a vertical moving bed reduction reactor, which is mainly divided into two parts: a reduction zone, where the reduction gas circulates at high temperature, hydrogen above 800° C. and carbon monoxide reduce the iron oxides to produce DRI, and the hydrogen and carbon monoxide produce water and carbon dioxide; and the reduction zone located in the lower part of the reduction zone, where the hydrogen and carbon monoxide produce water and carbon dioxide; and a cooling zone located in the lower part of the reduction zone, in which the DRI in the cooling zone is cooled to ambient temperature by cooling gases containing hydrogen and carbon monoxide circulating in a cooling circuit before the DRI is discharged.

The reductant used in the gas-based method is mainly natural gas, which is steam-converted or partially oxidized to produce a syngas $CO+H_2$. The price of natural gas is expensive, and the price of refined syngas produced by large-scale coal gasification is also relatively high. Thus, finding an inexpensive raw material channel for reducing gas is an issue that must be faced in order to vigorously develop DRI production.

In the olefin industry, a catalytic dehydrogenation of propane produces propylene and hydrogen, which happens to be one of the feedstocks for DRI. If it is possible to combine DRI with the olefin industry, it will revolutionize DRI.

SUMMARY OF THE INVENTION

In order to achieve the above purpose, the present invention provides a steel smelting method that combines the olefin industry with steel smelting, utilizes the by-products of the olefin industry to provide a reducing agent for steel smelting, and realizes their efficient combination.

In order to achieve the above purpose, the present invention provides a steel smelting method comprising the following steps:

A propane is subjected to a catalytic dehydrogenation reaction, wherein electricity is used to provide power for the catalytic dehydrogenation reaction;

the products of the catalytic dehydrogenation reaction are separated to give a mixed gas containing hydrogen, methane and ethane, as well as ethylene and propylene;

the mixed gas containing hydrogen, methane and ethane is mixed with water and/or $CO_2$, and then used as a catalytic conversion feedstock to produce a syngas for iron smelting by a catalytic conversion reaction, wherein electricity is used to provide power for the catalytic conversion reaction.

According to a specific embodiment of the present invention, preferably, the catalytic dehydrogenation reaction is carried out in a reaction tube;

a front section of the reaction tube is filled with a catalytic dehydrogenation catalyst, and used to subject propane to the catalytic dehydrogenation reaction;

a rear section of the reaction tube is not filled with a catalyst, and used to subject propane to a steam cracking reaction.

When the temperature of the catalytic dehydrogenation reaction is lower, a portion of the propane is present in the product without being converted, and this portion of propane needs to be separated from the olefin product and recovered in conventional catalytic dehydrogenation reactions of propane. The present invention integrates catalytic dehydrogenation and steam cracking of propane into a single reaction tube by filling the first half of the tube with catalytic dehydrogenation catalyst and the second half of the tube without catalyst, and the integration cannot be realized by existing gas furnaces, and the propane that does not undergo catalytic dehydrogenation can be subjected to steam cracking to obtain products such as methane, ethane, hydrogen, and the like. The separated methane and ethane can be further converted by catalytic conversion to obtain CO, and finally a mixed gas containing hydrogen, CO and the like can be obtained. After adjusting the composition, a syngas suitable for direct reduction of iron can be obtained.

When catalytic dehydrogenation and steam cracking of propane are integrated into a single reaction tube, the water required for steam cracking can be added together with propane or separately added in the middle part of the reaction tube.

According to a specific embodiment of the present invention, preferably, the power is provided by heating the reaction tube (reaction tube for catalytic dehydrogenation reaction, catalytic conversion reaction, steam cracking reaction) by means of an induction coil, and the reaction material inside the reaction tube is supplied with heat from the reaction tube. After the induction coil is supplied with power, electromagnetic induction is generated between the reaction tube and the induction coil, and the reaction tube generates heat, thereby realizing the heating of the reaction material inside the reaction tube. In the process, the induction coil is preferably wrapped around the outside of the reaction tube, and a thermal insulation material (e.g., cement, fireproof material, etc.) can be filled between the reaction tube and the induction coil. Conventional steam cracking devices and catalytic dehydrogenation devices is provided with heat through combustion of fuel oil and gas, and then the reaction tube is heated through heat exchange with the reaction tube to realize the heating of the reaction tube, and thus the cracking and catalytic dehydrogenation raw materials is heated in the reaction tube. However, such heat exchange tends to be not uniform, and the heat would be concentrated in a local area, resulting in that the cracking reaction and the catalytic dehydrogenation reaction is also not uniform. The present invention, on the other hand, heats the reaction tube by means of an induction coil, which has a high heating efficiency, and the induction coil is uniformly distributed on the reaction tube, such that the reaction tube uniformly generates electromagnetic induction, and realizes uniform heating of the cracking raw material and the catalytic dehydrogenation raw material.

According to a specific embodiment of the present invention, preferably, the frequency of the current inputted into the induction coil is medium frequency or high frequency to meet the needs of electromagnetic induction as well as controlling the reaction temperature. During the process of implementation, the frequency of the control current can be selected according to the desired reaction temperature. The high frequency is 5-20 KHz, preferably 8-16 KHz, more preferably 10-15 KHz, further preferably 12-14 KHz, and specifically may be 8 KHz, 8.5 KHz, 9 KHz, 9.5 KHz, 10 KHz, 10.5 KHz, 11 KHz, 11.5 KHz, 12 KHz, 12.5 KHz, 13 KHz, 13.5 KHz, 14 KHz, 14.5 KHz, 15 KHz, 15.5 KHz, 16 KHz, or it may be a range obtained by combining the endpoints of the above ranges as well as the enumerated specific frequency values with each other, such as 5-16 KHz, 5-15 KHz, 5-10 KHz, 8-20 KHz, 8-15 KHz, 8-10 KHz, 10-20 KHz, 10-16 KHz, 10-12 KHz, 9-20 KHz, 9-15 KHz, 12-15 KHz, 12-14 KHz, 12-20 KHz; the medium frequency is 50-3000 Hz, preferably 300-2000 Hz, more preferably 600-1500 Hz, and specifically may be 300 Hz, 400 Hz, 500 Hz, 600 Hz, 700 Hz, 800 Hz, 900 Hz, 1000 Hz, 1100 Hz, 1200 Hz, 1300 Hz, 1400 Hz, 1500 Hz, 1600 Hz, 1700 Hz, 1800 Hz, 1900 Hz, 2000 Hz, or it may be a range obtained by combining the endpoints of the above ranges as well as the enumerated specific frequency values with each other, such as 300-3000 Hz, 300-1500 Hz, 600-3000 Hz, 600-2000 Hz, 1000-3000 Hz, 1000-2000 Hz, 1200-3000 Hz, 1200-2000 Hz, 1500-3000 Hz, 1500-2000 Hz, and the like.

According to a specific embodiment of the present invention, preferably, the frequency of the current inputted into the induction coil is regulated by a power supply and a capacitor. The induction coil is connected to the power supply to form a circuit, and the power supply is connected in parallel with the capacitor as shown in FIG. 1. The power supply used in the present invention may be a commonly used industrial power supply, such as a medium frequency power supply or a high frequency power supply. The power and other specification parameters of the power supply can be selected according to the frequency that needs to be adjusted to, and the rated power of the power supply is preferably 100-1000 KW, and more preferably 200-500 KW. The specification of the capacitor can also be selected as desired, as long as it is sufficient to be able to be matched with the power supply to meet the frequency control requirements.

According to a specific embodiment of the present invention, preferably, the induction coil is one or a combination of two or more selected from ferrite coils, iron core coils, hollow coils, copper core coils and the like.

According to a specific embodiment of the present invention, preferably, the raw material for the catalytic dehydrogenation reaction of propane is propane or a mixed gas of propane and hydrogen.

According to a specific embodiment of the present invention, preferably, in the mixed gas of propane and hydrogen, the volume ratio of propane to hydrogen is from 1:1 to 5:1, preferably 3:1.

According to a specific embodiment of the present invention, preferably, the catalyst for the catalytic dehydrogenation reaction of propane is a platinum-based catalyst or a chromium-based catalyst, more preferably a Pt—Sn—K/$Al_2O_3$ catalyst or a Cr—K dehydrogenation catalyst.

According to a specific embodiment of the present invention, preferably, the reaction temperature of the catalytic dehydrogenation reaction of propane is 500-1000° C., more preferably 550-850° C., further preferably 550-600° C.

According to a specific embodiment of the present invention, preferably, the reaction temperature of the steam cracking reaction is 500-1000° C., preferably 600-900° C., more preferably 650-850° C., further preferably 750-850° C. or 650-750° C.

According to a specific embodiment of the present invention, preferably, the steam cracking reaction has a water-oil ratio of 0.3-0.7, preferably 0.4-0.5.

According to a specific embodiment of the present invention, preferably, the steam cracking reaction has a residence time of 0.1-1.0 s, preferably 0.2-0.85 s.

According to a specific embodiment of the present invention, the separation of the products of the steam cracking reaction can be carried out in a conventional manner, as long as the separation of ethylene, propylene and other gases can be realized. After the separation, a mixed gas containing hydrogen, methane and ethane as well as ethylene and propylene are obtained, wherein the ethylene and propylene can be exported as a product, and the mixed gas is subjected to a further catalytic conversion, such that the methane and propane and water and/or $CO_2$ undergo a catalytic conversion to obtain CO and $H_2$, thereby obtaining a syngas, which is transported to the sponge iron production unit for the production of sponge iron.

According to a specific embodiment of the present invention, preferably, the method further comprises the step of adjusting the composition of the syngas to a volume percentage content of CO+$H_2$ of >90%, and a volume ratio of $H_2$/CO of 1.5-2.5 (preferably 1.7-1.9), so as to be able to enter into a vertical moving bed reactor for the production of sponge iron. In actual production, if the prepared mixed gas contains sulfur, it can be desulfurized in a conventional process before the catalytic conversion.

According to a specific embodiment of the present invention, preferably, the active component of the catalytic conversion reaction is nickel, and the carrier is one or a combination of two or more selected from alumina, magnesium oxide and magnesium-aluminum spinel; the content of the active component is 5-20% by total mass of the catalyst.

According to a specific embodiment of the present invention, preferably, the reaction conditions of the catalytic conversion reaction are: a pressure of 0.1-1.0 MPa, a reaction temperature of 500-1100° C. (preferably 500-850° C.), a space velocity of 500-4000 $h^{-1}$ (preferably 500-2000 $h^{-1}$), and a volume ratio of water and/or $CO_2$ to $CH_4$ of 1.2-1.5/1.

According to a specific embodiment of the present invention, the size of the reaction tube used in the present invention can be selected as desired, wherein the inner diameter of the reaction tube can be 50-250 mm and the length can be selected according to the reaction requirement.

According to a specific embodiment of the present invention, the material of the reaction tube may be a metal or an alloy, respectively, including but not limited to the materials typically used for reaction tubes for steam cracking reaction and reaction tubes for catalytic dehydrogenation reaction. The metal or alloy is preferably one capable of withstanding a temperature of 1000° C., more preferably one capable of withstanding a temperature of 1200° C. The material of the reaction tube of the present invention may be selected from 316L stainless steel, 304S stainless steel, HK40 high-temperature furnace tube material, HP40 high-temperature furnace tube material, HP Micro Alloy micro-alloyed steel, Manaurite XTM material for steam cracking furnace, or the like.

Conventional catalytic dehydrogenation of propane produces propylene and hydrogen, and the hydrogen is emitted as waste and rarely utilized effectively. The present invention combines the olefin industry with iron and steel smelting, realizing the effective utilization of hydrogen and improving the quality of iron and steel smelting at the same time. Moreover, traditional catalysts of the catalytic dehydrogenation of propane deactivate quickly, require periodic regeneration, and require a moving bed process to meet the regeneration and heat absorption requirements of the catalyst, with complex equipment and large investment. By using electric heating for power supply, the present invention allows the use of pipeline fixed-bed dehydrogenation reactors in a series, which are programmed to react, purge and regenerate, and to match the controllable fill of the grid. When grid power consumption is urgently needed, it is possible to have most of the reactors running for dehydrogenation and propylene production, while leaving most of the dehydrogenation reactors in the purge and regeneration state when not needed.

The traditional olefin industry is a high power-consuming industry, and the traditional ethylene industry consumes about 0.5 tons of fuel per ton of ethylene produced. The famous olefin technology companies in the world include Lummus, S&W, KBR, Linde, TPL/KTI, etc. All steam cracking devices are powered by heating with a steam cracking furnace and a fuel burner tube, of which the structure is complicated, the investment in equipment is large, and the investment in cracking furnace accounts for about 30% of the investment in the whole olefin production. In the present invention, it is changed to electric power supply without burner combustion and flue gas power recovery system, and can realize single stove pipe heating and burning carbon processing, as well as stove pipe internal power supply, which is a feature that is difficult to achieve with conventional combustion heating. Furthermore, it is highly innovative and offers a range of degrees of freedom, significantly simplifying the olefin production process and increasing process flexibility. For the production of olefins and hydrogen by using propane, the equipment investment is small, the structure is simple, and power saving and emission reduction can be realized.

In the present invention, based on the fact that propane cannot be fully converted under some reaction conditions, the catalytic dehydrogenation of propane is combined with steam cracking, and the unconverted propane is made into methane, ethane and other components through the steam cracking. Further, by reforming and composition adjustment, a syngas, which is a good raw material for direct reduction of iron, is obtained.

The present invention utilizes electricity to provide power for catalytic dehydrogenation reaction and steam cracking reaction through electromagnetic coil, which is a new use of electricity and solve the current problem of excess electricity. Moreover, utilizing the electromagnetic coil to provide power can make the heat distribution of the reaction tube more uniform, and it is easier to control the reaction temperature and the progress of the reaction.

BRIEF DESCRIPTION OF THE DRAWINGS

FIG. 1 is a schematic circuit diagram of the power supply, electromagnetic coil, and capacitor of the present invention.

DETAILED DESCRIPTION OF PREFERRED EMBODIMENTS

In order to have a clearer understanding of the technical features, objectives and beneficial effects of the present invention, the following detailed description of the technical solutions of the present invention is given, but it is not to be understood as limiting the implementable scope of the present invention.

Example 1

This example provides a steel smelting method comprising the following steps:

the catalyst is filled into a reaction tube, and activated with hydrogen or nitrogen;

the raw materials containing propane are introduced into the reaction tube for a catalytic dehydrogenation reaction;

the products of the catalytic dehydrogenation reaction are separated to give a mixed gas containing hydrogen, methane and ethane, as well as ethylene and propylene in which the ethylene and propylene are output as products;

the mixed gas containing hydrogen, methane and ethane is subjected to the catalytic conversion: the mixed gas is allowed to enter the catalytic conversion reactor tube, and then reacts with the input $CO_2$ in the catalytic conversion reactor tube to convert hydrocarbons such as methane, ethane, and $CO_2$ into CO and $H_2$;

the composition of the catalytically converted gas product is adjusted to the extent that the volume percentage content of $CO+H_2$ is >90% and the volume ratio of $H_2/CO$ is 1.5-2.5 (preferably 1.7-1.9), and then it is fed into a gas-based shaft furnace for the production of sponge iron;

in the gas-based shaft furnace, iron ore oxide pellets are added from the top of the shaft furnace and move from top to bottom, the syngas enters the furnace from the perimeter pipe of the reduction section at the bottom of the shaft furnace and flows from bottom to top, wherein the syngas undergoes a reduction reaction with the oxide pellets to obtain sponge iron and top gas, with the main reaction: $3H_2+Fe_2O_3=2Fe+3H_2O$. There is no carbon dioxide emission during the above process.

The above top gas can be subjected to a washing and cooling treatment, a compression treatment and a desulfurization and decarburization treatment at one time, so as to obtain an unreacted reducing gas.

In the above reaction, electricity is used to provide power for the catalytic dehydrogenation reaction and catalytic conversion reaction through electromagnetic induction, which is carried out using the device shown in FIG. 1. The device includes a power supply (300 KW medium-frequency power supply), a capacitor (matching with the medium-frequency power supply), an induction coil (copper-core coil, 30 cm in length, wrapped around the outside of the reaction tube), a catalytic dehydrogenation reaction tubes (316L stainless steel, 30 cm in length, 1.7 cm in inner diameter) and a catalytic conversion reaction tube (316L stainless steel, 30 cm in length, 1.7 cm in inner diameter), wherein the induction coil is connected to the power supply to form a circuit, and the power supply is connected in parallel with the capacitor. The power supply is used to adjust the electricity to a current of appropriate frequency, which is then input into the capacitor, through which the induction coil is powered. Electromagnetic induction generated between the reaction tube and the energized induction coil starts generating heat, which heats up the raw materials inside the reaction tube in order to allow the catalytic dehydrogenation and catalytic conversion reactions to take place. In the reaction tube, the raw materials enter from the upper end of the reaction tube and the products leave from the lower end of the reaction tube.

The composition of the propane feedstock used in the example is shown in Table 1.

TABLE 1

| Composition of the propane feedstock | | | | | | | | | | | | |
|---|---|---|---|---|---|---|---|---|---|---|---|---|
| feedstock vapor phase | methane | ethane | ethylene | propane | cyclopropane | propylene | iso-butane | n-butane | trans-butene | n-butene | iso-butene | cis-butene |
| propane | 0.227 | 0.0595 | 0.0058 | 97.4485 | 0.0221 | 1.4684 | 0.3638 | 0.1569 | 0.0867 | 0.0889 | 0.0187 | 0.0537 |

The reaction conditions and results are shown in Table 2, in which the catalyst is a Cr-based catalyst commonly used for propane dehydrogenation; the start position for catalyst filling is defined as the position between the top position of the catalyst filled in the reaction tube and the horizontal position of the inductor coil inlet; in the reaction tube, the part of the reaction tube where the induction coil is wrapped around the outside of the reaction tube is filled with catalyst, starting from the catalyst filling position and going downward; and in addition to methane, ethane, ethylene, propane, propylene, another component mainly remaining in the product is hydrogen.

The voltage, current and power given in Table 2 are parameters under experimental conditions. In industrial applications, the reaction tube would have a larger size, or the like, and the degree of reaction will be different from the experimental conditions. Industrial electricity is generally 220V three-phase or 380V three-phase, and the current and power can be adjusted according to the actual situation (Table 3 shows the upper limit of the parameters under industrial electricity conditions). This difference in parameters does not make a substantial difference to the products.

TABLE 2

| No. | position for start filling catalyst | activization | voltage V | current A | power KW | frequence KHz | temperature ° C. | methane | ethane | ethylene | propane | propylene | propane conversion | propylene slectivity | propylene yield |
|---|---|---|---|---|---|---|---|---|---|---|---|---|---|---|---|
| 1 | 2.5 cm below the horizontal position of the induction coil inlet | nitrogen purge at 300° C. for 0.5 h, at 590° C. for 0.5 h, with space velocity of 300 $h^{-1}$ | 32 | 7.9 | 0.3 | 11.4 | 600 | 2.5512 | 0.4036 | 2.8312 | 73.5719 | 19.746 | 24.41% | 76.64% | 18.71% |
| | | | 31 | 7.8 | 0.3 | 11.2 | 650 | 2.3897 | 0.4118 | 2.9089 | 73.6246 | 19.779 | 40.53% | 36.09% | 14.63% |
| | | | 45 | 10.2 | 0.5 | 10.7 | 700 | 25.1288 | 8.8634 | 19.7498 | 24.4026 | 20.7268 | 74.96% | 26.36% | 19.76% |
| 2 | 2.5 cm below the horizontal position of the induction coil inlet | nitrogen purge at 600° C. for 0.5 h, with space velocity of 300 $h^{-1}$ | 38 | 7.8 | 0.3 | 11.3 | 600 | 8.0757 | 0.3611 | 1.8621 | 83.9201 | 5.2798 | 13.88% | 28.17% | 3.91% |
| | | | 52 | 11.2 | 0.8 | 12.8 | 650 | 12.97 | 1.3052 | 9.2328 | 64.0451 | 11.9417 | 34.28% | 31.35% | 10.75% |
| | | | 62 | 12.9 | 1 | 12.7 | 700 | 28.6929 | 3.8921 | 22.3345 | 31.8928 | 12.6049 | 67.27% | 16.99% | 11.43% |
| | | | 65 | 13.6 | 1.2 | 12.6 | 800 | 69.4705 | 4.2447 | 22.5429 | 2.5492 | 1.0991 | 97.38% | −0.39% | −0.38% |
| 3 | the horizontal position of the induction coil inlet | nitrogen purge at 300° C. for 1 h, at 550° C. for 1 h, with space velocity of 300 $h^{-1}$ | 42 | 9.4 | 0.6 | 13.6 | 550 | 6.1046 | 1.1912 | 10.0097 | 66.373 | 14.9502 | 31.89% | 43.38% | 13.83% |
| | | | 43 | 9.5 | 0.6 | 13.8 | 600 | 15.904 | 3.6231 | 23.9943 | 31.9869 | 22.7686 | 67.18% | 32.54% | 21.86% |
| | | | 51 | 10.4 | 0.8 | 13.6 | 650 | 34.0685 | 7.3404 | 38.5291 | 6.8664 | 10.9231 | 92.95% | 10.44% | 9.70% |

TABLE 2-continued

| No. | position for start filling catalyst | activization | voltage V | current A | power KW | frequence KHz | temperature ° C. | methane | ethane | ethylene | propane | propylene | propane conversion | propylene slectivity | propylene yield |
|---|---|---|---|---|---|---|---|---|---|---|---|---|---|---|---|
| 4 | the horizontal position of the induction coil inlet | hydrogen purge at 350° C. for 2 h, with flow rate of 32 ml/min | 32 | 8 | 0.3 | 11.8 | 550 | 8.6396 | 2.1064 | 12.6161 | 58.8797 | 16.5837 | 39.58% | 39.19% | 15.51% |
| | | | 35 | 8.5 | 0.4 | 12.3 | 600 | 31.4723 | 7.9834 | 37.15 | 9.6902 | 11.894 | 90.06% | 11.88% | 10.70% |
| | | | 36 | 8.6 | 0.4 | 12.4 | 650 | 54.5859 | 8.7136 | 31.664 | 2.8599 | 1.9471 | 97.07% | 0.51% | 0.49% |

Example 2

This example provides a steel smelting method in which the catalytic dehydrogenation reaction and the steam cracking reaction of propane are integrated into a single reaction tube, and is the same as Example 1 except for the following steps:

In the reaction tube, catalyst filling begins at a point corresponding to 2.5 cm below the horizontal position of the induction coil inlet; the catalyst is filled until it corresponds to the general length of the induction coil outside the reaction tube, and the remaining portion is not filled with catalyst;

nitrogen is used for activation, with a purge of 0.5 h at 650° C. and a space velocity of 300 $h^{-1}$;

the raw materials containing propane and water are introduced into the reaction tube for the catalytic dehydrogenation reaction;

the product of the catalytic dehydrogenation reaction undergoes the steam cracking reaction in the lower half of the reaction tube, with the water-oil ratio controlled at 0.4 and a residence time of 0.3 s;

the products of the catalytic dehydrogenation reaction and the steam cracking reaction are separated to give a mixed gas containing hydrogen, methane and ethane, as well as ethylene and propylene, in which the ethylene and propylene are output as products.

Electricity is used to provide power for the steam cracking reaction through electromagnetic coil, with the same equipment, operation and parameters as in Example 1. The reaction conditions and the products are shown in Table 4.

Based on the above, it can be seen that the catalytic dehydrogenation of propane in combination with the production of sponge iron can develop new applications for the by-products of the catalytic dehydrogenation of propane, while providing new applications for electricity.

TABLE 3

| Parameter upper limits under industrial electricity conditions | | | |
|---|---|---|---|
| power | voltage | current | frequency |
| 200 KW | 3-phase 380 V | 305 A | 5-20 KHz |
| 300 KW | 3-phase 380 V | 455 A | 5-20 KHz |
| 500 KW | 3-phase 380 V | 760 A | 5-20 KHz |
| 200 KW | 3-phase 220 V | 530 A | 5-20 KHz |
| 300 KW | 3-phase 220 V | 790 A | 5-20 KHz |
| 500 KW | 3-phase 220 V | 1320 A | 5-20 KHz |

TABLE 4

| voltage V | current A | power KW | frequency KHz | temperature ° C. | methane % | ethane % | ethylene % | propane % | propylene % | propane conversion % | propane selectivity % | propylene yield % |
|---|---|---|---|---|---|---|---|---|---|---|---|---|
| 50 | 10.8 | 0.8 | 13.3 | 650 | 4.3021 | 0.1161 | 0.7072 | 91.3066 | 2.877 | 6.30 | 22.93 | 1.45 |
| 70 | 14 | 1.3 | 13.5 | 700 | 7.8717 | 0.4396 | 4.4786 | 78.4061 | 8.1223 | 19.54 | 34.94 | 6.83 |
| 78 | 15.4 | 1.5 | 13.4 | 800 | 30.8997 | 4.4536 | 20.8537 | 32.5722 | 10.7535 | 66.57 | 14.31 | 9.53 |
| 78 | 15.3 | 1.5 | 13.3 | 850 | 63.2978 | 7.8189 | 24.6991 | 2.3788 | 1.715 | 97.56 | 0.26 | 0.25 |

The invention claimed is:

1. A steel smelting method, comprising the steps of:

subjecting propane to a catalytic dehydrogenation reaction, wherein electricity is used to provide power for the catalytic dehydrogenation reaction;

separating the products of the catalytic dehydrogenation reaction to give a mixed gas containing hydrogen, methane, and ethane, and separately recovering ethylene and propylene;

mixing the mixed gas containing hydrogen, methane, and ethane with water and/or $CO_2$, and then using the mixture as a catalytic conversion feedstock to produce a syngas for iron smelting by a catalytic conversion reaction, wherein electricity is used to provide power for the catalytic conversion reaction.

2. The method according to claim 1, wherein the catalytic dehydrogenation reaction is carried out in a reaction tube; and a front section of the reaction tube is filled with a catalytic dehydrogenation catalyst, to allow propane to undergo the catalytic dehydrogenation reaction;

a rear section of the reaction tube is not filled with a catalyst, to allow propane to undergo a steam cracking reaction.

3. The method according to claim 1, wherein the power is provided by heating the reaction tube by means of an induction coil, and the heat is supplied from the reaction tube to the reaction materials inside the reaction tube.

4. The method according to claim 3, wherein the induction coil is wrapped around the outside of the reaction tube.

5. The method according to claim 3, wherein the frequency of the current inputted into the induction coil is a medium frequency or a high frequency, wherein the high frequency is 5-20 KHz and the medium frequency is 50-3,000 Hz.

6. The method according to claim 3, wherein the frequency of the current inputted into the induction coil is regulated by a power supply and a capacitor.

7. The method according to claim 6, wherein the induction coil is connected to the power supply to form a circuit, and the power supply is connected in parallel with the capacitor.

8. The method according to claim 6, wherein the power of the power supply is 100-1,000 KW.

9. The method according to claim 3, wherein the induction coil is one or a combination of two or more selected from ferrite coils, iron core coils, hollow coils, and copper core coils.

10. The method according to claim 1, wherein the raw material for the catalytic dehydrogenation reaction is propane or a mixed gas of propane and hydrogen and the volume ratio of propane to hydrogen is from 1:1 to 5:1.

11. The method according to claim 1, wherein the catalyst for the catalytic dehydrogenation reaction is a platinum-based catalyst or a chromium-based catalyst.

12. The method according to claim 11, wherein the catalyst for the catalytic dehydrogenation reaction is a Pt—Sn—K/$Al_2O_3$ catalyst or a Cr—K dehydrogenation catalyst.

13. The method according to claim 1, wherein the reaction temperature of the catalytic dehydrogenation reaction is 500-1,000° C.

14. The method according to claim 2, wherein the reaction temperature of the steam cracking reaction is 500-1,000° C.;

the water-to-oil ratio for the steam cracking reaction is 0.3-0.7; and the residence time of the steam cracking reaction is 0.1-1.0 s.

15. The method according to claim 14, wherein the water-to-oil ratio for the steam cracking reaction is 0.4-0.5.

16. The method according to claim 1, wherein the method further comprises a step of adjusting the composition of the syngas to a volume percentage content of $CO+H_2$ of >90%, and a volume ratio of $H_2/CO$ of 1.5-2.5.

17. The method according to claim 1, wherein:

a catalyst of the catalytic conversion reaction has an active component of nickel and a carrier which is one or a combination of two or more selected from alumina, magnesium oxide and magnesium-aluminum spinel, and the content of the active component is 5-20% based on the total mass of the catalyst; and the reaction conditions of the catalytic conversion reaction are: a pressure of 0.1-1.0 MPa, a reaction temperature of 500-1,100° C., a space velocity of 500-4,000 $h^{-1}$, and a volume ratio of water and/or $CO_2$ to $CH_4$ of 1.2-1.5/1.

18. The method according to claim 2, wherein the material for the reaction tube is a metal or alloy.

19. The method according to claim 18, wherein the metal or alloy is selected from 316L stainless steel, 304S stainless steel, HK40 high-temperature furnace tube material, HP40 high-temperature furnace tube material, HP Micro Alloy micro-alloyed steel or a high-temperature nickel-chromium alloy.

20. The method according to claim 18, wherein the reaction tube has an inner diameter of 50-250 mm.

* * * * *